April 9, 1957 R. A. McCALLUM 2,788,203
HOSE GUIDE AND ALIGNING MEANS FOR TRANSMITTING
FLUID UNDER PRESSURE OVER THE ROLL-OVER JOINT
OF A KERF CUTTING MACHINE
Filed Aug. 22, 1952 3 Sheets-Sheet 1

INVENTOR.
Robert A. McCallum
BY
Murray G. Gleeson
Attorney

April 9, 1957    R. A. McCALLUM    2,788,203
HOSE GUIDE AND ALIGNING MEANS FOR TRANSMITTING
FLUID UNDER PRESSURE OVER THE ROLL-OVER JOINT
OF A KERF CUTTING MACHINE
Filed Aug. 22, 1952    3 Sheets-Sheet 2

INVENTOR.
Robert A. McCallum
BY
Murray A. Gleeson
Attorney

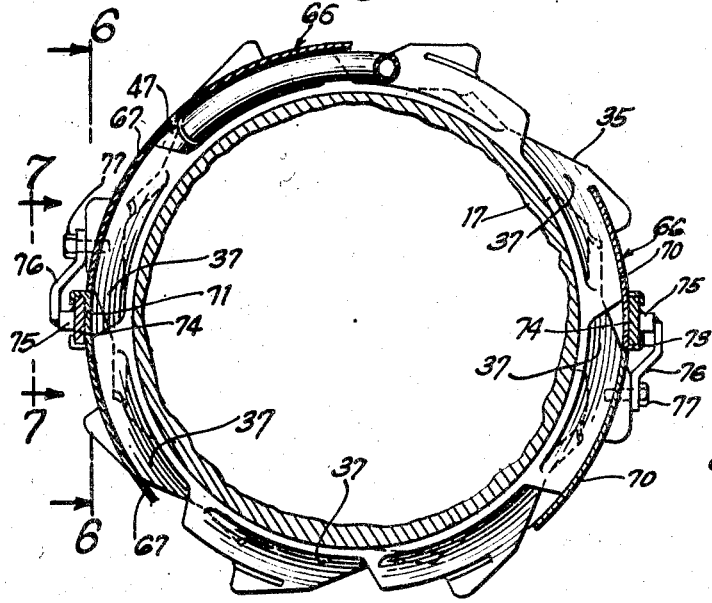
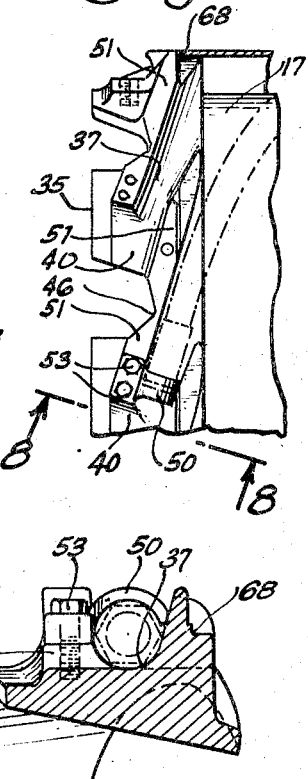
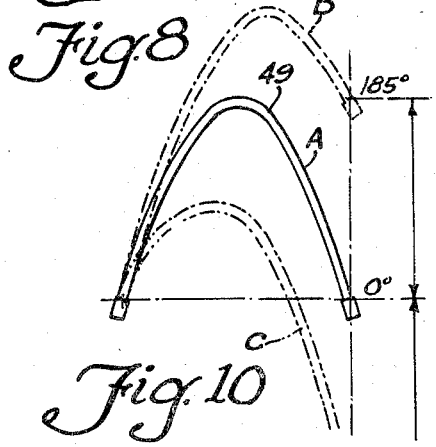

United States Patent Office  2,788,203
Patented Apr. 9, 1957

2,788,203

HOSE GUIDE AND ALIGNING MEANS FOR TRANSMITTING FLUID UNDER PRESSURE OVER THE ROLL-OVER JOINT OF A KERF CUTTING MACHINE

Robert A. McCallum, Clarendon Hills, Ill., assignor to Goodman Manufacturing Company, Chicago, Ill., a corporation of Illinois Application August 22, 1952, Serial No. 305,743

7 Claims. (Cl. 262—28)

This invention relates to improvements in kerf cutting machines and more particularly relates to an improved hose retainer and guide for the roll-over joint of a kerf cutting machine, for transmitting fluid under pressure from a stationary part to a rotatable part of the machine.

Heretofore, kerf cutting machines of the combination horizontal and shearing type, which cut from a wheel mounted truck, have tilted the cutter bar and pivoted it about the axis of its drive sprocket by means of hydraulic motors supplied with hydraulic fluid under pressure from a source of fluid under pressure on the truck and controlled by valves on the truck.

In order to provide hydraulic power to the hydraulically operated motor devices, for swinging and tilting the cutter bar, flexible hoses have usually been used, which must be loose to accommodate the roll-over boom, supporting the cutter head and cutter bar, for turning movement about a longitudinal axis to position the bar for top cutting or bottom cutting or for shearing along either rib of the working place. Since the roll-over boom and cutter head and bar must be rotated at least 180° to position the cutter bar in its extreme horizontal and vertical cutting positions, and since the boom must be capable of being rotated in opposite directions to facilitate the positioning of the bar in the required cutting position, the conduits or hoses used to transmit the fluid under pressure must have sufficient slack to accommodate this turning movement of the roll-over boom with respect to its bearing support, and the slack hoses frequently foul, or are injured or broken by falling rock. Attempts have been made to eliminate the hoses, but these attempts have resulted in expensive and complicated manifolds, subject to leakage and therefore impractical for use in mining machines.

A principal object of my invention is to remedy the difficulties heretofore present in the transmission of fluid under pressure from a source of fluid under pressure on a stationary part to the operating parts for the cutter bar and cutter head on the end of a roll-over boom of a kerf cutting machine, by providing a simple form of means for confining the slack parts of the fluid transmitting conductors and accommodating the slack parts to move in angular paths during positioning of the cutter bar from one extreme cutting position to the other.

A further object of my invention is to provide a means for transmitting hydraulic fluid under pressure from a stationary part to an axially rotatable part by means of flexible fluid conductors, by forming the conductors with slack portions and fixing the conductors at the ends of the slack portions thereof, one fixed end of which is stationary and the other fixed end of which is rotatable, and by confining the slack portions of the conductors to a cylindrical plane and guiding the conductors to shift in a generally axial direction during rotation of one part with respect to the other.

A further and more detailed object of my invention is to provide a novel and simple form of hose retainer and guide means for transmitting hydraulic power past the roll-over joint of a kerf cutting machine, utilizing two widely spaced axially aligned guide members, one of which is rotatable and the other of which is held from rotation, and providing slack in the hose between these guide members and connecting the hose thereto to form an open loop, and confining the open loop to move along a cylindrical plane coaxial with the axis of the roll-over joint.

A still further object of my invention is to provide a hose connection between two rotating parts, one of which rotates about an axis extending longitudinally of the other, so arranged as to accommodate the parts to rotate for more than 180° in either direction without restricting the flow of fluid under pressure therebetween, and comprising two axially aligned allochiral guide members, each having the hose guided thereacross at opposite angles to form a generally parabolic slack portion therebetween, and by providing a cover between the guide members confining the hose to a generally cylindrical plane for movement therealong during movement of one part with respect to the other.

These and other objects of my invention will appear from time to time as the following specification proceeds and with reference to the accompanying drawings, wherein:

Figure 5 is a fragmentary transverse sectional view taken substantially along line 5—5 of Figure 3;

Figure 6 is an enlarged fragmentary view in side elevation of one of the guide rings for the hose, showing the ring mounted on the support for the roll-over boom and also showing the retaining cover mounted between the rings and confining the hose to move along a generally cylindrical plane;

Figure 7 is a fragmentary view in side elevation, looking in the direction of the arrows extending from line 7—7 of Figure 5;

Figure 8 is a sectional view taken substantially along line 8—8 of Figure 6;

Figure 9 is an enlarged view of one of the guide rings; and

Figure 10 is a diagrammatic view illustrating the form taken by the open loop of the fluid conducting hose from one extreme position of the roll-over boom to the other in either direction of rotation thereof.

Figure 1:
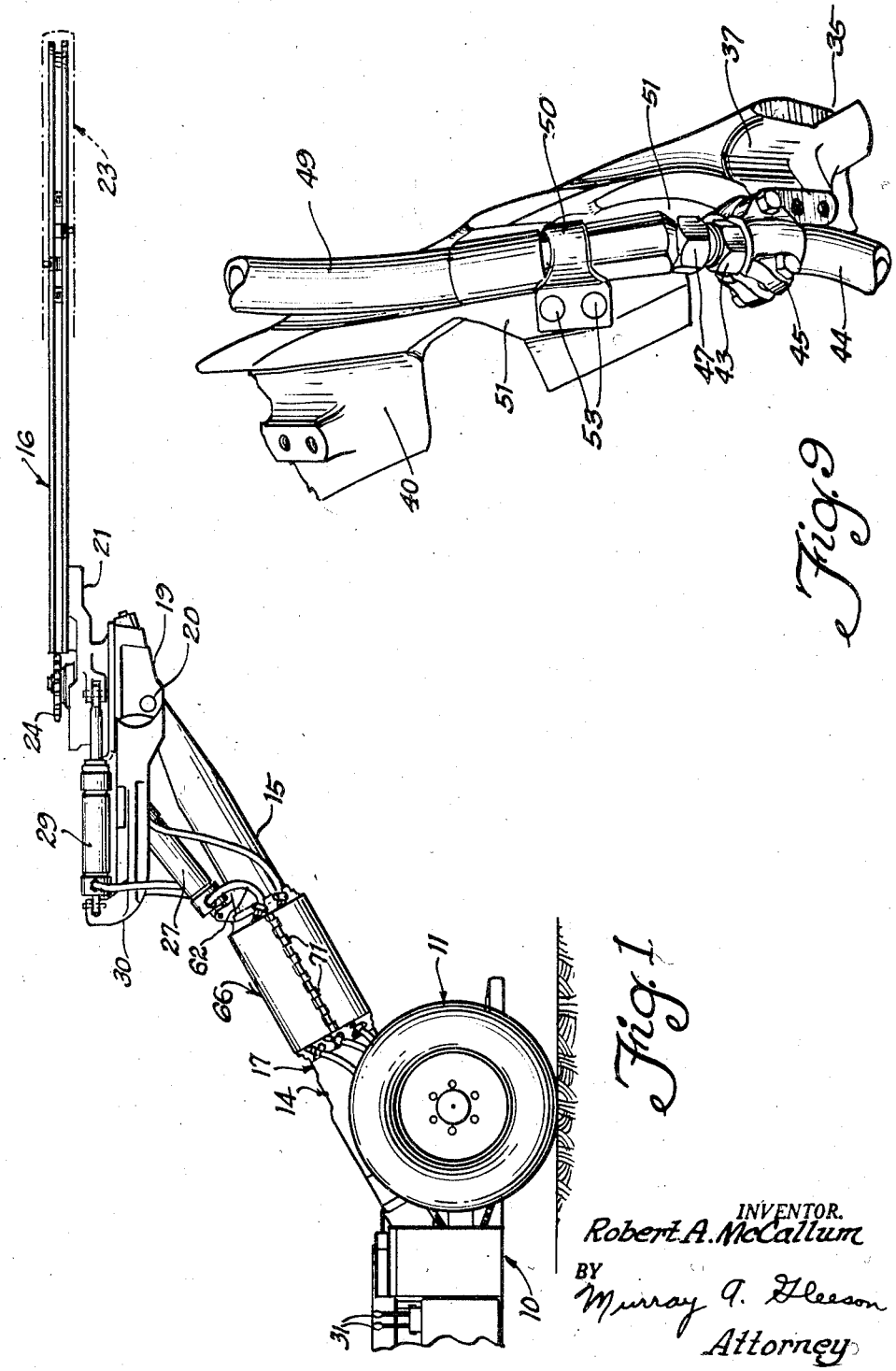
Figure 1 is a fragmentary view in side elevation of the forward end portion of a kerf cutting machine constructed in accordance with my invention.

In Figure 1 of the drawings I have shown a combination horizontal and shearing type of kerf cutting machine of the truck mounted type. The machine includes generally a main frame 10 mounted on wheels 11, 11 herein shown as being rubber tire mounted wheels, but which may be either flanged track type or rubber tire mounted wheels. The machine is of the same general construction as that shown in a companion application, Serial No. 305,742, filed August 22, 1952, and entitled "Horizontal and Shearing Kerf Cutting Machine," now Patent No. 2,750,180, so need not herein be shown or described in detail.

A turntable (not shown) may be mounted at the forward end of the main frame 10 and form a support for a motor 14 on suitable trunnion supports (not shown). Fluid motor devices (not shown) may tilt the motor 14 about the trunnion supports and vary the elevation of a roll-over boom 15 extending forwardly from said motor, and a cutter bar 16 projecting from the forward end of said boom. The turntable also forms a means for feeding the cutter bar 16 laterally across the coal face to cut a kerf therein, as is well known to those skilled in the art.

The motor 14 is shown as having an elongated cylindrical support member 17 extending forwardly therefrom, within which is journaled the elongated roll-over boom 15. The boom 15 extends a substantial distance in advance of the cylindrical support 17 and has a cutter head 19 transversely pivoted thereto on trunnion pins 20, 20, as in my aforementioned companion application, Serial No. 305,742, so not herein further described.

The cutter head 19, in turn, has a cutter bar support frame 21 journaled thereon for rotation about an axis perpendicular to the axis of the trunnion pins 20, 20. The cutter bar 16 is suitably mounted on the frame 21 and projects forwardly therefrom.

The cutter bar 16 is shown as having the usual cutter chain 23 orbitally guided thereabout and driven by a cutter chain sprocket 24 journaled in the cutter head 19, coaxial with the axis of pivotal movement of the cutter bar support 21 and cutter bar 16 with respect to said cutter head. The sprocket 24 is driven from the motor 14 by means of a shaft 25 journaled in the roll-over boom 15, concentric with the turning axis thereof, and driving said sprocket through a universal drive connection and bevel gearing driven thereby, as in my aforementioned companion application, Serial No. 305,742, so not herein shown or described.

The cutter head 19 is tilted about the axis of the trunnion pins 20, 20 by means of suitable fluid motor means, herein shown as being a double-acting cylinder and piston unit 27 connected between said boom and cutter head and operatable to tilt said cutter head in either direction and to hold said cutter head in adjusted relation with respect thereto.

The cutter bar 16 is likewise swung about the axis of the cutter chain drive sprocket 24 by means of two single-acting cylinder and piston units 29, 29 operably connected to the cutter bar support 21 at diametrically opposed points and pivotally supported at their rear ends on rearwardly extending arms 30, 30 of the cutter head 19, shown as extending along opposite sides of the roll-over boom 15.

A tank and pump (not shown) may be mounted on the main frame 10 to afford a source of fluid under pressure to tilt the cutter head and cutter bar and to rotatably move the cutter bar 16 about the axis of the sprocket 24. The tilting and rotating movements of said cutter bar may be controlled by suitable valve mechanism indicated generally by reference character 31, and preferably located to be operated from each side of the machine, just rearwardly of the front wheels 11. The valve mechanism and tank and pump need not herein be shown or described, since they may be of any well known form and are no part of my present invention.

Figure 3:
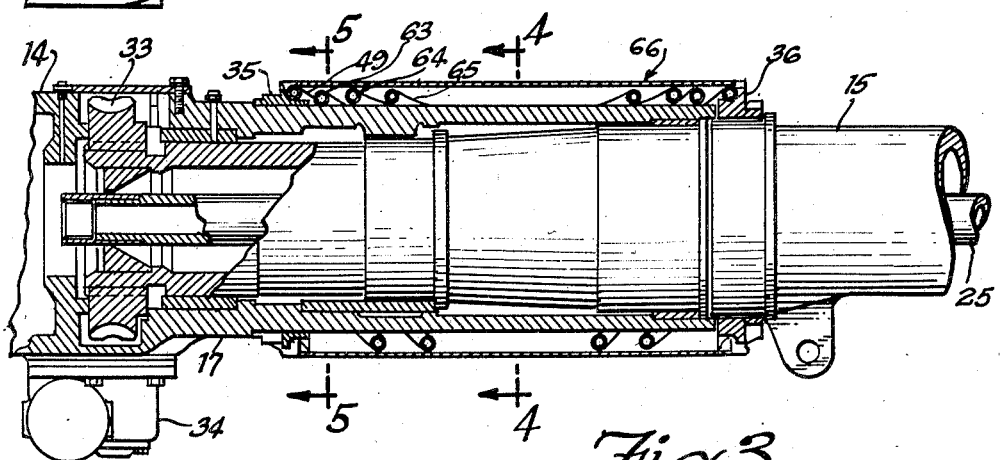
Figure 3 is a fragmentary longitudinal sectional view taken through the boom and support shown in Figure 2.
Figure 4:
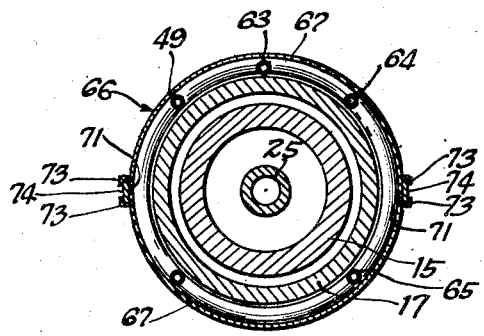
Figure 4 is a fragmentary transverse sectional view taken substantially along line 4—4 of Figure 3.

The roll-over boom 15 is shown in Figure 3 as being turned about its longitudinal axis and held in the desired position of adjustment by means of a worm gear 33 keyed or otherwise secured to said boom adjacent the inner or rear end thereof and driven by a worm (not shown) and a suitable fluid motor 34 mounted on the outside of the cylindrical support 17.

Referring now in particular to the guide and aligning means for the conduits or hoses transmitting fluid under pressure from the valve mechanism 31 on the main frame 10 to the cylinder and piston units 27 and 29, 29, a house retaining and aligning ring 35 is mounted on the cylindrical support member 17 adjacent the rear end thereof and is suitably secured thereto. A similar but allochiral hose retaining and aligning ring 36 is mounted on the boom 15 at the forward end of the support member 17, and is suitably secured thereto for rotation therewith.

Figure 2:
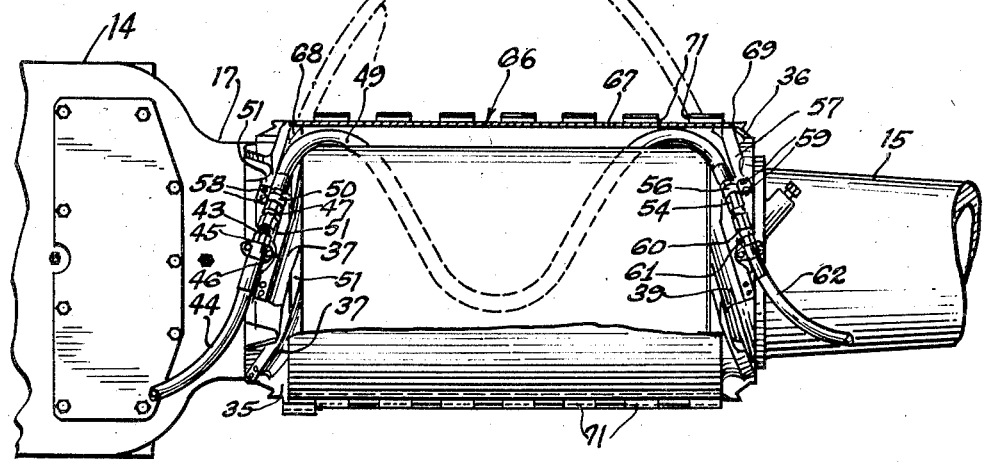
Figure 2 is an enlarged fragmentary plan view of the rear part of the roll-over boom supporting the cutter head and cutter bar of the kerf cutting machine, and the cylindrical support therefor, showing only one fluid pressure transmitting hose for the purpose of simplicity, and illustrating one manner in which the hose retainer and guide of my invention may be embodied.

The ring 35 is shown as having a plurality of spaced hose retainer guides in the form of grooves 37, 37 extending diagonally across the periphery thereof and inclined from left to right as shown in Figure 2. The ring 36 has similar hose retainer guides in the form of grooves 39, 39, shown in Figure 2 as extending diagonally thereacross from right to left. Each hose retainer guide 37 is shown as extending diagonally across the periphery of the ring 35 at a relatively steep angle with respect to the longitudinal axis of the boom 15, to guide a pressure hose 49 onto the outer surface of the support member 17 and to extend transversely across the periphery of said support member at an angle with respect thereto. The guide grooves 37, 37 are sufficiently deep to recess the hose and its couplings beneath the top surface of the ring 35 and afford a protection to the hose and its couplings.

Each guide groove 37 is shown as having an advance entering face 40 disposed at a relatively sharp angle with respect to the groove 37 to guide the hose upwardly onto an associated guide groove 37 (see Figure 7). A coupling 43 shown as being connected to a pressure hose 44, which may lead from the valve mechanism 31, is shown as extending along the face 40. The hose 44 is shown as being retained to the coupling 43 by a hose clamp 45 fitting within a recessed portion 46 in advance of the steeply inclined entering face 40 of the guide groove 37. The coupling 43 is also shown as being connected to a second coupling 47 extending at an obtuse angle with respect to the coupling 43 along a guide groove 37, and connected to the end of the looped hose 49. The coupling 47 is retained to the groove 37 by means of a clip 50 shown as being secured to a rib 51 extending between two adjacent grooves 37, as by cap screws 53, 53. The clip 50 is shown as extending over the top of the coupling 37 into clamping engagement therewith.

The guide grooves 39, 39, formed in the ring 36, are shown as extending at an opposite angle to the angle of the guide grooves 37, 37, to guide the hose 49 from the support 17 at an angle directly opposite from the angle the hose enters said support, and to form the hose with a slack portion in the form of an open loop in the space between the rings 35 and 36. The slack portion of the hose is shown in Figures 2 and 9 as being of a generally parabolic form, the peak of which moves in one direction or another along the support 17 upon rotatable movement of the boom 15 from one extreme position to another.

The opposite end of the hose 49 from the guide ring 35 is connected with a coupling 54 secured to a groove 39 which is aligned with the groove 37 in the ring 35 when the roll over from 15 is in a neutral position, which may be the top cutting position shown in Figure 1. The coupling 54 is clamped to the guide groove 39 as by a clip 56, secured to a rib 57 of the guiding ring 36 by cap screws 59, 59. A second coupling 60 like the coupling 43 and extending angularly inwardly with respect to the coupling 54 along an angular exit face 61 of the groove 39, has a hose 62 connected thereto, herein shown as leading to the head end of the tilting cylinder and piston unit 27, to supply fluid under pressure thereto, to tilt the cutter bar 16 about the axis of the trunnion pins 20, 20.

In a similar manner, hoses 63, 64 and 65 may be guided in and connected to other diagonal guide grooves 37 and 39 in the rings 35 and 36, respectively, and may be clamped thereto in the same manner the hose 49 is clamped to its respective guide grooves. One of these hoses may be connected with the piston rod end of one cylinder and piston unit 27. The others may be connected to the head ends of the other cylinder and piston units 29, 29. The hoses 63, 64 and 65 may be nested within the hose 49 and have slack portions conforming to the form of the slack portion of the hose 49, so as to afford the free passage of fluid from the guide ring 35 to the guide ring 36.

Where the machine is provided with other mechanisms at the cutter head, additional hoses may be connected between the guide and aligning rings 35 and 36, to take care of the supply and release of fluid under pressure to a slack conveyor drive motor (not shown) which may be provided to carry the cuttings away from the cutter bar, but which is not herein shown or described since it is no part of my present invention. Another hose may be provided to conduct water to the cutter head, to spray the cuttings so as to reduce the dust content in the atmosphere during cutting.

The hoses 49, 63, 64 and 65 being connected between the two guide and aligning rings 35 and 36 in the form of nested open loops may be loosely confined to the plane of the periphery of the support member 17, to slidably move along said support member during roll-over movement of the boom 15.

As herein shown, a cylindrical guard or shield 66 encircles the support 17 between the rings 35 and 36 and is spaced radially from the periphery of said support. The shield 66 forms a guide and confining means for the hoses 49, 63, 64 and 65 and is shown as being in two parts 67, 67 for convenience in assembly and to facilitate the initial confining of the hoses to the periphery of the support 17. The parts 67, 67 are shown as being halves of the shield 66 and are of a similar construction. When the shield 66 is assembled on the rings 35 and 36, said parts are recessed in recessed shoulder portions 68 and 69 of the guide rings 35 and 36, respectively, it being understood that the ring 36 moves relatively to the shield 66 upon turning movement of the roll-over boom 15.

The halves 67, 67 of the shield 66 are shown as being semi-cylindrical in form and as having a plurality of spaced tabs 71, 71 extending alternately from opposite sides thereof. The halves 67, 67 are so positioned in assembling the shield 66 that the tabs 71, 71 on one-half may interleave the tabs 71, 71 on the other half, and form a means for connecting the halves 67, 67 together. Each tab 71 is shown as being bent outwardly adjacent its end, and as then being bent to extend backwardly therealong in parallel relation with respect thereto, as indicated by reference character 73, to form in effect a guide or channel for receiving a locking bar 74.

When the halves 67, 67 of the shield 66 are in registry with each other with the tabs 71, 71 interleaving, the locking bars 74, 74 may be slidably engaged with the guides or channels formed by the inturned ends 73, 73 of said tabs and retain the halves 67, 67 of the shield 66 together, in an obvious manner.

Each locking bar 74 is shown as having a lug 75 extending outwardly from its outer end portion. The lug 75 is shown as having one end of an arm 76 secured thereto and serves to space said arm from said bar to permit free insertion of said bar into locking engagement with the tabs 71, 71. The arm 76 is shown as extending from the bar 74 at right angles with respect thereto into position to engage a rib 51 of the guide and retainer ring 35, and may be secured thereto as by a cap screw 77. The arm 76 of one locking bar 74 is shown as extending downwardly therefrom so as to position the two arms for securement to the adjacent ribs 51, 51 on the ring 35 and clamp the shield to said ring into slidable engagement with the ring 36.

Upon assembly of the shield 66, the top part 67 may first be mounted between the rings 35 and 36 to partially wrap the several hoses 49, 63, 64 and 65 around the periphery of the support member 17 from a position like that shown by dash dot lines in Figure 2 to the position shown by dotted lines in this figure. The bottom half 67 may then be moved into registry with the top half to position the tabs 71, 71 into interleaving engagement with each other. During this positioning and registering operation of the bottom half 67, the remainder of the loops of the hoses 49, 63, 64 and 65 may be wrapped around the support 17 by engagement of the bottom half therewith. The two halves may then be locked together and secured to the stationary guide and aligning ring 35, as previously described.

Sufficient clearance is provided between the inner periphery of the shield 61 and the several hoses on the cylindrical surface of the support member 17 to permit relatively free movement thereof angularly along the cylindrical surface of the support 17 during rotatable movement of the boom 15, to position the cutter bar 16 in its extreme cutting positions.

It should here be understood that in kerf cutting machines which cut along the mine roof or bottom and cut shearing kerfs along either rib, the roll-over boom must rotate 180° in either direction from a neutral position A, to position the cutter bar to cut in the required plane, and must be capable of an additional amount of rotatable adjustment to compensate for irregularities in the mine floor, and the difference in angle between the main frame 10 and either the mine roof or bottom or ribs.

Figure 10 diagrammatically illustrates the forms taken by the slack portion of the hose 49 in its developed state upon rotation of the roll-over boom 15 through arcs of 185° in either direction from a neutral position "A." "B" indicates the form the hose 49 will take upon rotation of the ring 36 with respect to the ring 35 through an arc of 185° in a counterclockwise direction, while "C" indicates the form the hose 49 will take upon rotation of the ring 36 with respect to the ring 35 through an arc of 185° in a clockwise direction. In position "A," the hose 49 assumes a generally parabolic form and upon rotation of the ring 36 with respect to the ring 35 in either direction the peak of the parabola shifts to the right or the left as one leg of the hose is foreshortened or elongated, depending upon the direction of rotation of the ring 36. The hose 49 thus slides angularly along the cylindrical surface of the support member 17 between the rings 35 and 36 during rotatable positioning movement of the roll-over boom 15 when moving into position to position the cutter bar 16 in the various desired cutting positions, and said hose is always in position to accommodate the free flow of fluid under pressure therethrough between the two rings 35 and 36, regardless of a position of the roll-over boom 15 and cutter bar 16 with respect to the support 17.

It should be understood that the hoses 63, 64 and 65 nested within the hose 49 will assume the same forms as the hose 49, during positioning movement of the roll-over boom 15.

It may be seen from the foregoing that a simplified form of hose guide and aligning means is provided which is particularly adapted for use in kerf cutting machines having a cutter head and a cutter bar mounted on the end of a roll-over boom, and confines the fluid pressure hoses supplying fluid under pressure to accommodate a plurality of positioning operations of the cutter bar and cutter head of the machine, and to move along the cylindrical surface of the support for the boom during roll-over movement of the boom avoiding all loose and unprotected pressure hoses, with resultant danger of damaging or fouling thereof, and assuring an uninterrupted flow of fluid under pressure through the respective hoses in all positions of the roll-over boom 15 with respect to its support.

It will be understood that modifications and variations may be effected without departing from the spirit and scope of the novel concepts of the present invention.

I claim as my invention:

1. In an apparatus of the class described and in combination with a non-rotatable support and a rotatable support mounted thereon and having fluid motor means carried thereby, means transmitting power to said fluid motor means and accommodating said non-rotatable support to rotate with respect to said rotatable support comprising a hose extending along said supports from a source of fluid under pressure associated with said non-rotatable support, clamping members on said supports clamping said hose to said non-rotatable and said rotatable supports in such relation as to form an intermediate slack portion between said clamping members, and means confining the slack portion of said hose to a generally cylindrical plane comprising a cylindrical shield extending between and secured to one of said supports and spaced radially therefrom and forming a slidable confining guide for said hose.

2. In an apparatus of the class described and in combination with a non-rotatable support and a rotatable support carried thereby having fluid motor means thereon, means transmitting fluid under pressure from a source of fluid under pressure associated with said non-rotatable support to said fluid motor means on said rotatable support comprising a fluid pressure conducting hose extending along said supports from said source of fluid under pressure to said fluid motor means, longitudinally spaced guide and aligning means on said non-rotatable and rotatable supports, means clamping said hose to said guide and aligning means and forming a slack portion therein between said guide and aligning means, and a cylindrical shield extending between said guide and aligning means and encircling at least one of said supports and spaced radially therefrom to retain the slack portion of the hose to conform to a generally cylindrical plane in cooperation with the associated support.

3. In an apparatus of the class described, two aligned generally cylindrical supports, one extending within the other and one being rotatable with respect to the other about the longitudinal axis thereof in opposite directions for at least 180°, fluid motor means on one of said supports, two spaced guide and aligning rings one being mounted on said stationary support and the other being mounted on said rotatable support and having guide grooves extending angularly thereacross in opposite directions, a fluid pressure transmitting hose extending along said guide grooves and clamped thereto to form the hose in the space between said grooves in the form of an open loop of a generally parabolic form, and a generally cylindrical guard shield spaced outwardly from said supports and encircling the same and connected between said rings for confining the looped portion of said hose to the plane of the outer of said supports.

4. In a kerf cutting machine of the class described, a main frame, a motor thereon, a support extending from said motor and a roll-over boom journaled in said support for rotation about an axis extending longitudinally thereof, a cutter head transversely pivoted to the end of said boom, a cutter bar pivoted to said cutter head, means for rotating said boom for at least 180° in either direction to position said cutter bar in its various cutting planes, fluid pressure motor means adjustably moving said cutter head with respect to said boom and said cutter bar with respect to said cutter head, means transmitting fluid under pressure from a source of fluid under pressure on said main frame along said boom to said fluid pressure motor means comprising a plurality of fluid pressure hoses, two spaced guide and aligning members having a plurality of guide grooves extending angularly across the face thereof, one ring being mounted on said support and having said grooves extending thereacross in one angular direction, and the other ring being mounted on said boom for rotation with said boom and having said grooves extending at opposite angles to the grooves of said first ring, means clamping said hoses to said rings and grooves to form nested slack portions between said rings, and a generally cylindrical guard shield connected between said support and rings and spaced radially from said boom and confining said hoses to a generally cylindrical plane to slidably move within said shield toward and from said rings upon rotatable movement of said boom with respect to said support.

5. In a kerf cutting machine of the class described, a main frame, a motor on said main frame having a cylindrical support extending therefrom, a roll-over boom extending from and rotatably supported by said support, means for rotatably positioning said boom, a cutter head transversely pivoted to the end of said boom, a cutter bar projecting from said cutter head and pivotally mounted thereon, fluid pressure motor means for adjustably positioning said cutter head and bar with respect to said boom, and means for transmitting fluid under pressure from a source of fluid pressure on said main frame along said support and boom to said fluid motor means comprising a plurality of fluid pressure hoses, a hose guide and aligning ring mounted on said support and having a plurality of guide grooves extending angularly thereacross to receive said hoses therein, a coaxial hose guide and aligning ring mounted on said boom for rotation therewith and having a plurality of guide grooves extending angularly thereacross for receiving said hoses therein, said last mentioned guide grooves being allochiral to said first mentioned guide grooves, means clamping said hoses to longitudinally aligned guide grooves in said rings when said boom is in a neutral position to position said cutter bar for cutting in one plane, said clamping means forming said hoses with slack portions of generally parabolic forms between said rings, and a cylindrical guard shield encircling said support and mounted on said rings in radially spaced relation with respect to said support, said guard shield being secured to the stationary one of said rings and having slidable engagement with the rotatable one of said rings and confining the slack portions of said hoses to move toward and from said rings in a generally cylindrical plane upon rotatable movement of said boom with respect to said support.

6. In a hose guide and aligning device for accommodating the transmission of fluid under pressure from one part to a second part supported thereon for rotatable movement with respect thereto, two widely spaced axially aligned hose guide and aligning rings, one being mounted on the one part and the other being mounted on the second part and being rotatable therewith in opposite directions through more than 180°, one having a plurality of parallel hose-aligning and guiding grooves extending angularly across the periphery thereof at a relatively steep angle with respect to the axis of rotation of the rotatable part and the other having corresponding guide grooves allochiral with respect to said guide grooves in said first ring, a plurality of flexible hoses extending along said grooves and secured thereto to form in the space between said rings widely open loops of generally parabolic forms, and a generally cylindrical cover member mounted between said rings in radially spaced relation with respect to the hoses extending along said grooves and with respect to said parts and cooperating therewith to confine said hoses to lie in nested relation with respect to each other within said cover and to move in a generally axial direction along the inside of said cover upon rotation of one ring with respect to the other.

7. In a kerf cutting machine of the class described, a main frame, a motor on said main frame having a cylindrical support extending therefrom, a roll-over boom extended from and rotatably supported by said support, means for rotatably positioning said boom, a cutter head transversely pivoted to the end of said boom, a cutter bar pivoted to said cutter head and extending therefrom, fluid pressure motor means for adjustably moving said cutter head and cutter bar, and means for transmitting fluid under pressure from a source of fluid under pressure on said main frame along said support and boom to said fluid pressure motor means comprising a fluid pressure hose, two spaced guide and aligning rings therefor, one being mounted on said support and the other being mounted on said boom for rotation therewith, means clamping said hose to extend angularly across said guide rings and form an intermediate slack portion between said rings in the general form of a parabola, and a cylindrical guard shield mounted between said rings and encircling said support and boom in radially spaced relation with respect thereto and cooperating therewith to confine the slack portion of said hose to a generally cylindrical plane in all positions of rotation of said boom with respect to said support.

References Cited in the file of this patent

UNITED STATES PATENTS

| | | |
|---|---|---|
| 565,698 | Sparks | Aug. 11, 1896 |
| 643,459 | Bischoff | Aug. 11, 1896 |
| 809,327 | Rieske | Jan. 9, 1906 |
| 822,004 | Kronauer | May 29, 1906 |
| 2,182,127 | Joy | Dec. 5, 1939 |
| 2,396,237 | Baldwin et al. | Mar. 12, 1946 |
| 2,690,193 | Smith | Sept. 28, 1954 |